United States Patent
Lenz

(10) Patent No.: US 9,714,720 B2
(45) Date of Patent: Jul. 25, 2017

(54) ELECTRICAL ACTUATOR

(75) Inventor: Norbert Lenz, Celle (DE)

(73) Assignee: Cameron International Corporation, Houston, TX (US)

( * ) Notice: Subject to any disclaimer, the term of this patent is extended or adjusted under 35 U.S.C. 154(b) by 50 days.

(21) Appl. No.: 14/427,302

(22) PCT Filed: Sep. 10, 2012

(86) PCT No.: PCT/EP2012/003800
§ 371 (c)(1),
(2), (4) Date: May 13, 2015

(87) PCT Pub. No.: WO2014/037026
PCT Pub. Date: Mar. 13, 2014

(65) Prior Publication Data
US 2015/0240963 A1    Aug. 27, 2015

(51) Int. Cl.
*F16K 31/04*    (2006.01)

(52) U.S. Cl.
CPC ......... *F16K 31/047* (2013.01); *F16K 31/043* (2013.01); *F16K 31/046* (2013.01); *Y10T 74/2066* (2015.01)

(58) Field of Classification Search
CPC .... F16K 31/047; F16K 31/046; F16K 31/043; F16K 31/048; F16K 31/0689; Y10T 74/2066

(Continued)

(56) References Cited

U.S. PATENT DOCUMENTS 3,414,097 A * 12/1968 Denkowski ............. F16D 21/02
192/35
3,466,005 A * 9/1969 Kleeberg ................ F16K 31/44
251/69

(Continued)

FOREIGN PATENT DOCUMENTS

WO    2011009471    1/2011

OTHER PUBLICATIONS

PCT International Search Report; Application No. PCT/EP2012/003800; Dated Jun. 7, 2013; 4 pages.

*Primary Examiner* — Craig Schneider
*Assistant Examiner* — Andrew J Rost
(74) *Attorney, Agent, or Firm* — Fletcher Yoder, P.C.

(57) ABSTRACT

An electrical actuator (1) especially for operating a valve (2) has at least one electric motor (3), a drive shaft (4) driven by the electric motor (3) and a gear shaft (5) rotatable by the drive shaft (4), which gear shaft is connected to a valve member (6) in a motion-transferring manner. Between the drive shaft (4) and the gear shaft (5), a return stop device (7) especially acting both ways in rotational direction is formed. This return stop device (7) has a pot-shaped outer part (8) and a hub part (9) rotatably supported therein. The hub part (9) is connected to the gear shaft (5) in a torque-proof manner and within at least one free space (10) between the hub part (9) and the outer part (8) a wedging member is arranged. This is only movement into free rolling position by the drive shaft (4) under a rotation of the drive shaft (4). The invention enables an improvement of an electrical actuator to the effect that this is provided with a so-called "fail as is"-device, while having a simple, reliable and cost-efficient construction and without the use of a stronger motor.

22 Claims, 2 Drawing Sheets

(58) Field of Classification Search
USPC ............... 251/129.11, 69, 70, 71, 68, 74
See application file for complete search history.

(56) References Cited

U.S. PATENT DOCUMENTS

| | | | |
|---|---|---|---|
| 3,505,888 A * | 4/1970 | Denkowski | F16H 25/2018 |
| | | | 192/38 |
| 3,685,790 A | 8/1972 | Crowe | |
| RE30,135 E * | 11/1979 | Fitzwater | F16K 17/36 |
| | | | 251/66 |
| 4,289,038 A * | 9/1981 | Hore | F03G 1/00 |
| | | | 185/39 |
| 6,375,151 B1 * | 4/2002 | Vanderveen | F02D 9/02 |
| | | | 123/339.13 |
| 6,575,427 B1 * | 6/2003 | Rauch | F02D 9/1065 |
| | | | 123/339.15 |

* cited by examiner

ELECTRICAL ACTUATOR

CROSS-REFERENCE TO RELATED APPLICATION

This National Stage Application claims priority to and benefit of PCT Application No. PCT/EP2012/003800, entitled "Electrical Actuator", filed on Sep. 10, 2012, which is herein incorporated by reference in its entirety.

FIELD OF THE DISCLOSURE

This disclosure relates to an electrical actuator in particular, having a return stop device functioning in both ways.

BACKGROUND

Respective electrical actuators are known for example from the oil and gas industry for the operation of valves. Such valves include gate valves, chokes, ball valves, blow-out-preventers (BOP) or the like. In an application using the respective valves, an emergency measure is required in case of an energy failure, to adjust the valves to their closed or open position or alternatively secure the valves in their current position against the pressure of, for example, produced mineral oil. In this context, the two modes are referred to as "fail save close/open" and "fail as is". In the "fail save close/open"-mode, the valves are automatically adjusted to the closed/opened position by the assigned electrical actuator in the event of an energy failure and missing actuation. This may be achieved for example by pre-stressed spring packages or the like. In the "fail as is"-mode, the valves stay in the position that have assumed during the energy failure. Therefore, often a "fail as is" device is necessary, which holds the valve in the opened position, partly opened position, or in the position at the moment of the energy failure. At the same time, holding the valve in its current position should be achieved without the use of energy.

In some embodiments, electrical actuators such as those described in WO 2011/009471 A1 or WO 2011/006519 A1 are employed. The electrical actuator is, for example, coupled to the valve from outside and includes one or more electric motors. The motors drive a drive shaft, which may drive a respective gear shaft by means of a transmission gear. In some cases, the gear shaft may be used for directly turning a respective valve member via an adapter or the like. It is also possible that the rotational movement of the gear shaft is convertible into a linear movement by a ball-type linear drive or the like. The linear movement then serves for the linear adjustment of the respective valve member.

An object of the present disclosure is to improve a respective electrical actuator such that it is provided with a "fail as is"-device without requiring the use of a stronger motor, while having a simple, reliable and cost-effective construction.

This object is achieved by the features of claim 1.

In accordance with various embodiments a return stop device is included as an additional member within the electrical actuator that functions in both rotational directions of the drive or gear shaft. The return stop device comprises a pot-shaped outer part and a hub part, which is rotatably supported therein. The hub part is connected to the gear shaft in a torque-proof manner. Additionally, a free space is formed between the hub part and the outer part, and a wedging member is situated in the free space. Rotation of the drive shaft causes the wedging member to transition to a free rolling position, enabling the hub part to rotate relative to the outer part.

If, however, a respective torque acts upon the drive shaft from the side of the attached valve, e.g. via the gear shaft and the hub part, then no movement of the wedging member takes place to transition the wedging member to the free-rolling position. Instead, the wedging member stays in the wedging position and a turning back of the drive shaft caused by the attached valve is prevented.

Thus, in accordance with various embodiments, the return stop device is designed such that the wedging member prevents valve-induced rotation of the drive shaft and the gear shaft.

This means that the return stop device enables an unrestricted actuation by the drive shaft and the gear shaft for adjusting for the valve member in both rotational directions of the drive shaft. If, however, retroactive torques act on the drive shaft via the gear shaft from both sides of a wall member, then the return stop device blocks movement in both rotational directions.

The return stop device is arranged between the drive shaft and the gear shaft and comprises minimal parts, resulting in a simple, reliable and cost-efficient construction is the result. Besides that, the structure of the return stop device is very robust and compact, such that the installation space is small. According to the construction of the return stop device, moreover, during holding of the respective position in the "fail as is"-mode, no energy is required. Additionally, a stronger electric motor is not required for the electrical actuator because the return stop device enables an unimpeded driving in both directions when operating the drive shaft.

A simple installability and assignability of the respective parts of the return stop device is given for example when the outer part has a cylindrical inner side facing the hub part and the hub part has at least two wedging surfaces facing this inner side. Between the inner side of the outer part and each wedging surface, a roller-shaped wedge element is arranged as a wedging member. The wedging member—in particular, one of the wedge elements—is moved into the free rolling position by an adjusting element of the drive shaft. Thus, depending on the rotational direction of the drive shaft, one of the roller-shaped wedge elements may be moved into the free rolling position, while the other roller-shaped wedge element is practically arranged in an idle state or free wheel, respectively.

In some embodiments, the adjusting element comprises an adjusting pin arranged essentially in parallel to the drive shaft. The adjusting pin may be offset by a distance from the drive shaft.

Various electric motors are applicable for such an actuator. In some embodiments, two electric motors may be used to provide additional redundancy. In a simple embodiment, the drive shaft may be formed by a rotor of the electric motor. The respective stator may be fixed in the housing of the actuator.

A coupling between the gear shaft and the drive shaft enables rotation of the drive shaft to induce a corresponding rotation to the gear shaft. In some embodiments, the hub part has at least two coupling elements and the drive shaft has at least two counter-coupling elements, where the coupling elements engage or are engaged by the counter-coupling elements. This provides a rotational connection between the hub part (and thereby the gear shaft), and the drive shaft, where the hub part and the drive shaft are at least partly in mesh with each other. In some embodiments, a designed tolerance of the coupling elements and counter-coupling elements allows some rotational movement of either the hub part or the drive shaft before the coupling and counter-coupling elements engage each other. Additionally, the coupling pin may comprise a driving pin and the counter-coupling element may comprise a pin hole.

Since the respective coupling also is at hand, if the return stop device becomes operative, then it may prove advantageous if the coupling element and the counter-coupling element are in engagement with other under a clearance.

In some embodiments, the wedge elements may be biased away from each other by a compression spring between the elements. This allows the wedge elements to be biased to their wedge positions in the absence of influence by the adjusting element of the drive shaft.

The adjusting element may engage the wedge element by protruding from the drive shaft into the free space and being arranged in a circumferential direction of the hub part on both sides of the wedge elements. Depending on the rotational direction of the drive shaft, one of the adjusting elements will then move the respective wedge element into the free rolling position, thus enabling an according rotation of the drive shaft (and hub part) and the gear shaft.

The outer part of the return stop device is arranged unrotatably, which is achieved for example by fixing the outer part to the housing of the actuator.

The wedge surfaces are arranged at the hub part and may be designed in a variety of ways. In one embodiment, the wedge surfaces may essentially taper slantingly towards the inner surface of the outer part, such that the free space between the hub part and the inner surface of the outer part tapers to a clearance that is at least smaller than the wedge elements. Thereby, the two wedge surfaces are facing away from each other and each of the wedge surfaces is assigned to a respective wedge element.

In order to provide sufficient space for adjusting the wedge element and for positioning the compression spring, a center surface extending perpendicularly to a diameter of the outer part may be arranged between the wedge surfaces. Along this center surface, for example the compression spring is arranged, while on both sides of the center surface, the respective wedge surfaces are arranged with wedge elements arranged thereon.

A torque-proof connection between the hub part and the gear shaft exists, for example through the hub part being connected to the drive shaft by positive fit and especially by means of a key.

BRIEF DESCRIPTION OF THE DRAWINGS

In the following, an advantageous embodiment of the invention is described in detail by means of the figures attached in the drawing.

In the drawings.

DETAILED DESCRIPTION

In accordance with the various embodiments, a "fail as is" device comprises a return stop device, which is described in further detail below. The outcome from the above is that a "fail as is"-device is provided by the described return stop device, which holds the respective valve member in its position during energy failure when the energy failure becomes effective.

Figure 1:
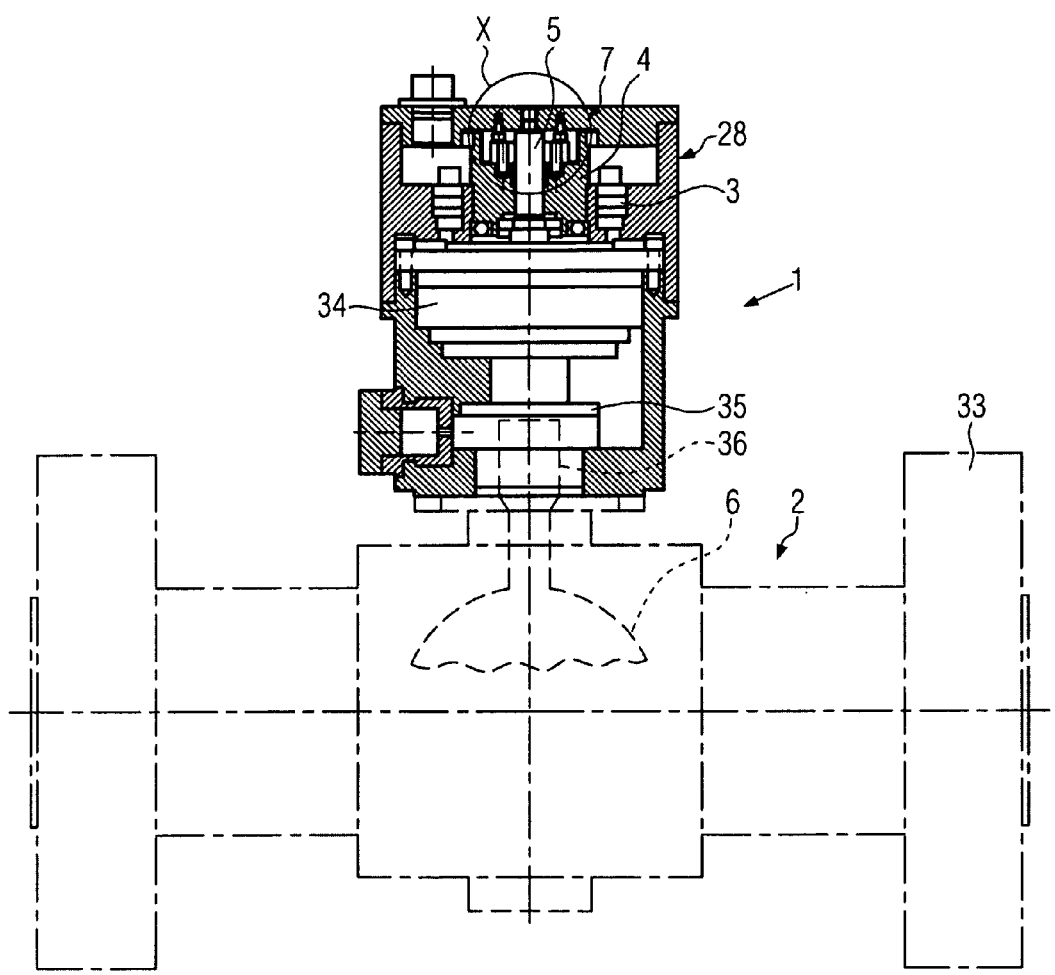
FIG. 1 shows a cross-section through an electrical actuator for operating ball valves.

FIG. 1 shows a principle illustration of an electrical actuator 1 according to the present disclosure. This is provided for operating a ball valve. Of course, the electrical actuator may also be employed for other gears in the oil and natural gas industry, such as for example gate valves, chokes, blow-out-preventers or the like. Further, it is to be noted that in the embodiment according to FIG. 1, a rotational movement of the respective valve member 6 of the valve 2 is transferred, while in other electrical actuators, also an additional conversion of the rotational movement into a linear movement may be effected by a ball-type linear drive.

The valve member 6 of the valve is only partly illustrated in the form of a pierced ball. This is rotatable by approx. 90° in order to transfer the valve member into an open or closed position, respectively, with respect to the duct 33.

The following disclosure applies to all respective valves or other members, particularly in the oil and natural gas industry.

The electrical actuator 1 comprises an actuator housing 28 that couples to an outer side of the valve 2, for example by way of a flange mount. An adapter flange 35 is provided for connection with the valve member 6. The drive shaft 36 of the valve member 6 is connected to the adapter flange 35. Within the adapter housing 28, further, a transmission gear 34 is arranged. The transmission gear 34 is connected to a gear shaft 5. The gear shaft 5 is rotated via a driving connection with a drive shaft 4 of an electric motor 3. The drive shaft 4 surrounds the gear shaft 5 and is connected thereto by a return stop device 7.

The electric motor 3 may have a stator and a rotor, wherein also several electric motors may be arranged behind each other or at various positions within the actuator housing 28 for both exerting a respective power and also for redundancy reasons.

Figure 2:
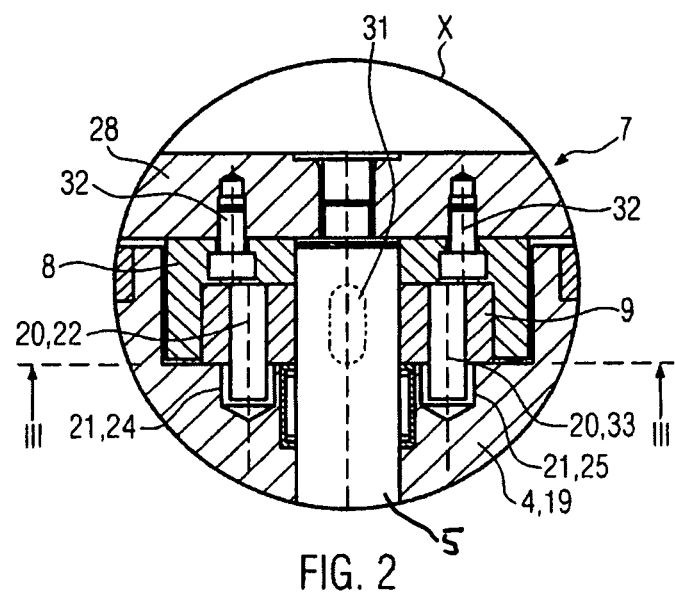
FIG. 2 shows an enlarged illustrating of a detail "X" from FIG. 1.

A detail "X" from FIG. 1 is illustrated enlarged in FIG. 2. This detail is especially concerned with the return stop device 7 between the drive shaft 4 and the gear shaft 5.

Figure 3:
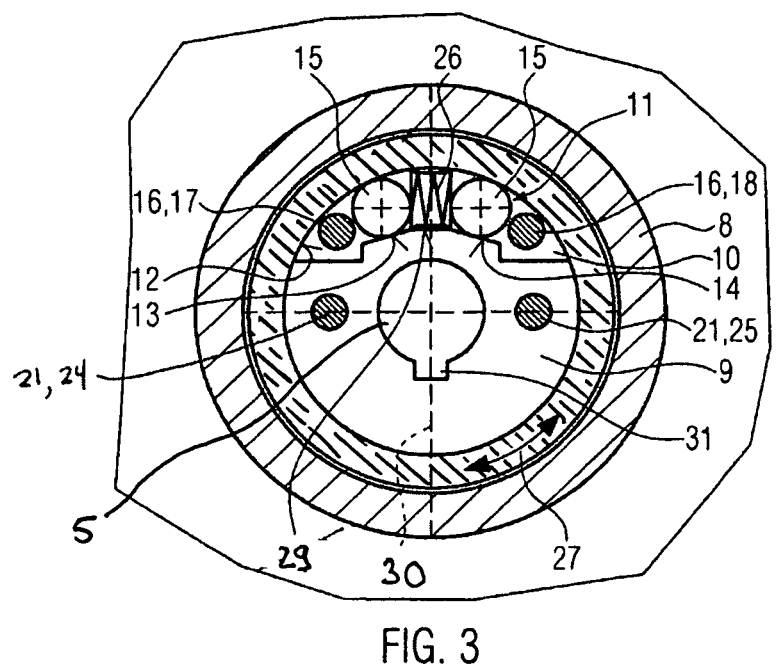
FIG. 3 shows a view from direction III-III according to FIG. 2.

The return stop device 7 has an approximately pot-shaped outer part 8, which may be detachably affixed to a part of the actuator housing 28 by a number of screws 32. Within the outer part 8, a hub part 9 is rotatably supported. As shown in FIG. 3, the outer part 8 has an inner face 12 that is proximate to the outer side of the hub part 9.

Referring back to FIG. 2, the drive shaft 4 partly surrounds the outer part 8 and is supported rotatably at the actuator housing 28 by means of ball bearing or the like, see also FIG. 1. The drive shaft 4 further has pin holes 24, 25 as counter-coupling elements 21. Driving pins 22, 23 protruding from the hub part 9 engage the counter-coupling elements 21 as coupling elements 20. The driving pins 22, 23 are arranged within the pin holes 24, 25 with a clearance therebetween. The driving pins 22, 23 protrude from the hub part 9 in the direction of the respective pin holes 24, 25. The hub part 9 is fixed on the gear shaft 5 arranged concentrically to the drive shaft 4 by means of a key 31 in a torque-proof manner. This means that the hub part 9 rotates with the gear shaft 5.

FIG. 3 corresponds to a view from the direction III-III according to FIG. 2. Referring to FIG. 3, the drive shaft 4 comprises adjusting pins 17, 18 as adjusting elements 16, which extend axially from the drive shaft 4. The adjusting elements 16 protrude from the drive shaft 4 into a free space 10, which is formed between the hub part 9 and the outer part 8.

The inner side 12 of the outer part 8 faces the outer side of the hub part 9. As shown in FIG. 3, the respective free space 10 is formed in the upper part of this figure between the hub part 9 and the outer part 8. The adjusting pins 17, 18 protrude into the free space 10, which also contains a wedging member 11. The wedging member 11 comprises two wedge elements 15, which may be roller-formed, and a compression spring 26 between the two wedge elements 15. The wedge elements 15 are arranged between wedge surfaces 13, 14 \ and the inner side 12 of the outer part 8. The wedge surfaces 13, 14 in FIG. 3 extend towards the outside and slantedly toward the inner side 12 of the outer part 8. A tapering wedge space is formed between the inner side 12 of the outer part 8 and the wedge surfaces 13, 14, which slant toward the inner side 12. The wedging elements 15 may be positioned in this wedge space.

As shown in FIG. 3, the adjustment pins 17, 18 are shown circumferentially "outside" their respective wedge elements 15.

In FIG. 3, an outer diameter 30 of the outer part 8 extends through the compression spring 26. The wedging member 11 is designed symmetrically with respect to the diameter 30. A similar symmetry may exist for the wedge surfaces 13, 14 on either side of a center surface 29, which extends perpendicularly to the diameter 30. From the center surface 29, wedge surfaces 13, 14 extend towards the outside and slantingly towards the respective inner side 12 of the outer part 8. Outside of the wedge elements 15 in the circumferential direction 27 in each case, the respective adjusting pin 17, 18, is arranged.

As already explained, these adjusting pins 17, 18 as adjustment element 16 are part of, and extend from, the drive shaft 4, which may be also a rotor 19 of the respective electric motor 3.

The drive pins 22, 23 are also visible in FIG. 3; to that end see also FIG. 2 and the above explanations.

In the following, the functional principle of the return stop device 7 is explained in connection with the electrical actuator 1.

The hub part 9 is connected to the gear shaft 5 by means of a respective key 31 in a positive-fit or form-fit manner. This and the associated transmission gear 34 transfer the driving power via the adapter flange 35 to the valve member 6, for example as shown in FIG. 1. Depending on the rotation direction of the gear shaft 5, the valve member 6 is turned into an open or closed position.

The outer part 8 of the return stop device 7 is non-rotatably arranged within the actuator housing 28, for example by the screws 32. Within the outer part 8, the hub part 9 is rotatably supported as shown in FIGS. 2 and 3. When rotating the drive shaft 4 by the electric motor in a rotational direction, one of the two adjusting pins 17, 18 is pushed against its associated roller-shaped wedge element 15 that is most closely positioned to it, see FIG. 3. The respective wedge element 15 is pushed against the force of the compression spring 26 in the direction of movement and also removed from the respective wedge engagement. Thus, the drive shaft 4 turns the hub part 9 by the drive pins 22, 23 and the gear shaft 5 through its positive fit with the hub part 9. As a result, the valve member 6 is also turned.

The other wedge element is not moved but in free-rolling position and may be rotated accordingly.

The functional principle is analogous under a rotation of the drive shaft 4 in the other direction.

When the electric motor is turned off for instance or not operable for example, the possibility exists that, due to the respective pressure of the fluid within the valve 2, restoring torques may act upon the valve member 6 and thereby upon the gear shaft 5. Such steering responses may slightly turn the gear shaft 5, which restores the respective wedging engagement between the wedge surfaces 13, 14 and the inner side 12 of the outer part 8 and the wedging elements 15 arranged therebetween. This takes effect in both rotational directions of the gear shaft 5. The wedging of the gear shaft 5 takes place with respect to the outer part 8 and therefore with respect to the actuator housing 28.

A clearance between the pin holes 24, 25 and the drive pins 22, 23, enables a small movement of the gear shaft 5 before complete wedging of the wedge elements 15. Thus, in the given case, the wedging engagement is released by a rotation of the adjustment pins 17, 18.

In accordance with various embodiments a simple and reliable construction of an electrical actuator with return stop device results, which is cost-efficient, robust, and compact. Additionally, no energy is expended to hold the back torque generated by the valve.

Further during a rotation of the drive shaft and the gear shaft by the electric motor, a stronger motor is not required because of the arrangement of the return stop device 7.

The invention claimed is:

1. An electrical actuator for operating a valve, comprising:
at least one electric motor;
a drive shaft driven by the electric motor;
a gear shaft rotatable by the drive shaft, wherein the gear shaft is connected to a valve member of the valve in a movement transferring manner, and wherein the gear shaft is surrounded by the drive shaft; and
a return stop device between the drive shaft and the gear shaft, the return stop device comprises:
a pot-shaped outer part and a hub part supported rotatably in the outer part, wherein the drive shaft at least partially surrounds the outer part, and wherein the hub part is connected to the gear shaft in a torque-proof manner;
at least one free space between the hub part and the outer part, wherein the at least one free space extends in a circumferential direction at least partially about a central axis of the drive shaft; and
a wedging member arranged in the at least one free space, wherein the wedging member is configured to move in the circumferential direction along the at least one free space between a wedged position and a free rolling position, and the wedging member is moveable into the free rolling position by the drive shaft only under a rotation of the drive shaft.

2. The electrical actuator according to claim 1, wherein the outer part comprises a cylindrical inner side facing the hub part and the hub part has at least two wedge surfaces facing the inner side, wherein the wedging member comprises a first roller-shaped wedge element arranged between the inner side of the outer part and a first wedge surface of the at least two wedge surfaces, the first roller-shaped wedge element being moveable circumferentially from the wedged position into the free rolling position by a first adjustment element.

3. The electrical actuator according to claim 2, wherein the first adjustment element comprises an adjustment pin that extends axially from the drive shaft relative to a rotational axis of the drive shaft.

4. The electrical actuator according to claim 2, wherein the wedging member comprises a second roller-shaped wedge element arranged between the inner side of the outer part and a second wedge surface of the at least two wedge surfaces, the second roller-shaped wedge element being moveable circumferentially from the wedged position into the free rolling position by a second adjustment element, and wherein a compression spring is disposed between the first and second roller-shaped wedge elements.

5. The electrical actuator according to claim 4, wherein the first and second adjustment elements extend axially from the drive shaft and protrude into the at least one free space.

6. The electrical actuator according to claim 2, wherein the at least two wedge surfaces slantingly taper radially outwards towards the inner side of the outer part.

7. The electrical actuator according to claim 1, wherein the drive shaft is formed by a rotor of the electric motor.

8. The electrical actuator according to claim 1, wherein the hub part has at least two coupling elements and the drive shaft has at least two counter-coupling elements, the coupling elements and the counter-coupling elements are at least partly in engagement with each other for a rotational connection of the hub part and the drive shaft.

9. The electrical actuator according to claim 5, wherein each coupling element comprises a drive pin and each counter-coupling element comprises a pin hole.

10. The electrical actuator according to claim 1, further comprising an actuator housing, wherein the outer part is detachably fixed to the actuator housing.

11. The electrical actuator according to claim 1, wherein the hub part is connected to the gear shaft by a positive fit device.

12. The electrical actuator according to claim 11, wherein the positive fit device comprises a key.

13. The electrical actuator according to claim 1, wherein the valve member is held as a "fail as is"-device in its position during energy failure by the return stop device during energy failure.

14. An electrical actuator for operating a valve, comprising:
   at least one electric motor;
   a drive shaft driven by the electric motor;
   a gear shaft rotatable by the drive shaft, wherein a rotation of the gear shaft is configured to rotate a valve member of the valve; and
   a return stop device between the drive shaft and the gear shaft, wherein the return stop device comprises:
      an outer part and a hub part supported rotatably in the outer part, wherein the hub part is fixed to the gear shaft;
      at least one free space between the hub part and the outer part, wherein the at least one free space extends in a circumferential direction at least partially about a central axis of the drive shaft; and
      a wedging member arranged in the at least one free space, wherein the wedging member is configured to move in the circumferential direction along the at least one free space between a wedged position and a free rolling position, the wedging member is moveable into the free rolling position by an adjustment element of the drive shaft only under a rotation of the drive shaft, and the adjustment element extends axially from the drive shaft relative to a rotational axis of the drive shaft and into the at least one free space.

15. The electrical actuator of claim 14, wherein the wedging member is configured to block valve-induced rotation of the gear shaft and the drive shaft.

16. The electrical actuator of claim 14, wherein the wedging member comprises a first wedging element, a second wedging element, and a compression spring disposed between the first and second wedging elements and configured to bias the first and second wedging elements away from each other.

17. The electrical actuator of claim 14, wherein the drive shaft surrounds the gear shaft, and the drive shaft at least partially surrounds the outer part.

18. An electrical actuator for operating a valve, comprising:
   at least one electric motor;
   a drive shaft driven by the electric motor;
   a gear shaft rotatable by the drive shaft, wherein a rotation of the gear shaft is configured to rotate a valve member of the valve; and
   a return stop device between the drive shaft and the gear shaft, wherein the return stop device comprises:
      an outer part and a hub part supported rotatably in the outer part, wherein the hub part is fixed to the gear shaft;
      at least one free space between the hub part and the outer part; and
      a wedging member arranged in the free space, wherein the wedging member comprises a first wedging element, a second wedging element, and a spring disposed between the first and second wedging elements and configured to bias the first and second wedging elements away from each other, and wherein the first and second wedging elements are only moveable into a free rolling position by the drive shaft under a rotation of the drive shaft.

19. The electrical actuator of claim 18 wherein the first wedging element is only moveable into the free rolling position by a first adjustment pin of the drive shaft, wherein the second wedging element is only moveable into the free rolling position by a second adjustment pin of the drive shaft, and wherein the first and second adjustment pins extend axially from the drive shaft relative to a rotational axis of the drive shaft.

20. The electrical actuator of claim 18, wherein the drive shaft surrounds the gear shaft, and the drive shaft at least partially surrounds the outer part.

21. An electrical actuator for operating a valve, comprising:
   at least one electric motor;
   a drive shaft driven by the electric motor, wherein the drive shaft is formed by a rotor of the electric motor;
   a gear shaft rotatable by the drive shaft, wherein the gear shaft is connected to a valve member of the valve in a movement transferring manner, and wherein the gear shaft is surrounded by the drive shaft; and
   a return stop device between the drive shaft and the gear shaft, the return stop device comprises:
      a pot-shaped outer part and a hub part supported rotatably in the outer part, wherein the drive shaft at least partially surrounds the outer part, and wherein the hub part is connected to the gear shaft in a torque-proof manner;
      at least one free space between the hub part and the outer part; and
      a wedging member arranged in the free space, wherein the wedging member is only moveable into a free rolling position by the drive shaft under a rotation of the drive shaft.

22. An electrical actuator for operating a valve, comprising:
   at least one electric motor;
   a drive shaft driven by the electric motor;

a gear shaft rotatable by the drive shaft, wherein the gear shaft is connected to a valve member of the valve in a movement transferring manner, and wherein the gear shaft is surrounded by the drive shaft; and a return stop device between the drive shaft and the gear shaft, the return stop device comprises:
- a pot-shaped outer part and a hub part supported rotatably in the outer part, wherein the drive shaft at least partially surrounds the outer part, the hub part is connected to the gear shaft in a torque-proof manner, the hub part has at least two coupling elements and the drive shaft has at least two counter-coupling elements, and the coupling elements and the counter-coupling elements are at least partly in engagement with each other for a rotational connection of the hub part and the drive shaft;
- at least one free space between the hub part and the outer part; and
- a wedging member arranged in the at least one free space, wherein the wedging member is only moveable into a free rolling position by the drive shaft under a rotation of the drive shaft.

* * * * *